US012234974B2

(12) United States Patent
Hong et al.

(10) Patent No.: US 12,234,974 B2

(45) Date of Patent: Feb. 25, 2025

(54) LIGHT-EMITTING MODULE AND DISPLAY DEVICE

(71) Applicant: XIAMEN TIANMA OPTOELECTRONICS CO., LTD., Xiamen (CN)

(72) Inventors: Junhua Hong, Xiamen (CN); Huasheng Yan, Xiamen (CN); Dong Wang, Xiamen (CN)

(73) Assignee: XIAMEN TIANMA OPTOELECTRONICS CO., LTD., Xiamen (CN)

(*) Notice: Subject to any disclaimer, the term of this patent is extended or adjusted under 35 U.S.C. 154(b) by 0 days.

(21) Appl. No.: 18/740,494

(22) Filed: Jun. 11, 2024

(65) Prior Publication Data

US 2024/0328613 A1 Oct. 3, 2024

(30) Foreign Application Priority Data

Mar. 13, 2024 (CN) ......................... 202410288645.3

(51) Int. Cl.

*F21V 23/00* (2015.01)
*F21V 11/16* (2006.01)
*F21V 23/06* (2006.01)

(52) U.S. Cl.

CPC ............ *F21V 23/006* (2013.01); *F21V 11/16* (2013.01); *F21V 23/06* (2013.01)

(58) Field of Classification Search

CPC ......... F21V 23/006; F21V 11/16; F21V 23/06
See application file for complete search history.

(56) References Cited

U.S. PATENT DOCUMENTS

2020/0043681 A1* 2/2020 Chen ..................... G06F 3/0213
2024/0324421 A1* 9/2024 Wang ................... H10K 59/871
2024/0329448 A1* 10/2024 Zhang ................... G02F 1/1333
2024/0369877 A1* 11/2024 Zhang ............... G02F 1/133606
2024/0389432 A1* 11/2024 Bao ........................ H10K 59/90
2024/0405157 A1* 12/2024 Ma .......................... H01L 33/62

FOREIGN PATENT DOCUMENTS

CN 209879376 U 12/2019

* cited by examiner

*Primary Examiner* — Christopher E Dunay
(74) *Attorney, Agent, or Firm* — KILPATRICK TOWNSEND & STOCKTON LLP

(57) ABSTRACT

A light-emitting module and a display device are provided. The light-emitting module includes a backlight module and a first circuit board electrically connected to the backlight module. The first circuit board includes a first surface and at least one first electrical connection terminal on the first surface; the backlight module includes a second circuit board, the second circuit board includes at least one second electrical connection terminal, and the at least one first electrical connection terminal and the at least one second electrical connection terminal are electrically connected on the first surface to form an electrical connection region; the light-emitting module further includes a fixing adhesive film; the fixing adhesive film includes a first light-transmitting region; and the light-emitting module at least includes a first state, the electrical connection region is visible through the first light-transmitting region in the first state.

20 Claims, 12 Drawing Sheets

LIGHT-EMITTING MODULE AND DISPLAY DEVICE

This application claims priority to Chinese Patent Application No. 202410288645.3, titled "LIGHT-EMITTING MODULE AND DISPLAY DEVICE", filed on Mar. 13, 2024 with the China National Intellectual Property Administration, which is hereby incorporated by reference in its entirety.

FIELD

The present disclosure relates to the field of display technology, and in particular to a light-emitting module and a display device.

BACKGROUND

Over decades of development, the display industry has evolved rapidly, transitioning from the era of Cathode Ray Tubes (CRTs) to Liquid Crystal Displays (LCDs), and now to Organic Light-Emitting Diodes (OLEDs) and light-emitting diode displays. This evolution has become closely intertwined with our lives, as electronic devices such as traditional mobile phones, tablets, TVs, PCs, smart wearable devices, VR systems, and vehicle displays rely heavily on the display technology.

In the manufacturing process of display products, there are multiple stages for a quality inspection process. However, due to the structural characteristics of display products, it is difficult to avoid the issue of missed inspections in certain areas. Therefore, there is an interest in how to reduce the probability of missed inspections for display products.

SUMMARY

In view of the above, a light-emitting module and a display device are provided according to embodiments of present disclosure. The quality inspection for an electrical connection region between a backlight module and a first circuit board can be implemented, which reduces the probability of missed inspections for display products.

In one embodiment, a light-emitting module is provided according to an embodiment according to the present disclosure. The light-emitting module includes a backlight module and a first circuit board electrically connected to the backlight module, where the first circuit board includes a first surface and at least one first electrical connection terminal on the first surface; the backlight module includes a second circuit board, where the second circuit board includes at least one second electrical connection terminal, and the at least one first electrical connection terminal and the at least one second electrical connection terminal are electrically connected on the first surface to form an electrical connection region; the light-emitting module further includes a fixing adhesive film, where the fixing adhesive film at least covers the first surface, an overlapping region of the second circuit board and the first surface, and the electrical connection region; the fixing adhesive film includes a first light-transmitting region, where the first light-transmitting region and the electrical connection region are overlapped in a first direction, the first direction is perpendicular to a plane where the first circuit board is located; and the light-emitting module at least includes a first state, where the electrical connection region is visible through the first light-transmitting region in the first state.

In one embodiment, based on the embodiments, a display device is provided according to an embodiment of the present disclosure. The display device includes the light-emitting module according to the embodiments of the present disclosure.

Any product implemented in the present disclosure does not necessarily need to achieve all the above-mentioned effects simultaneously.

Embodiments of the present disclosure will become apparent from following detailed description of exemplary embodiments of the present disclosure with reference to accompanying drawings.

BRIEF DESCRIPTION OF THE DRAWINGS

The accompanying drawings, which are incorporated in and constitute a part of this specification, illustrate embodiments of the present disclosure and explain principles of the present disclosure in conjunction with the description.

DETAILED DESCRIPTION OF EMBODIMENTS

Figure 1:
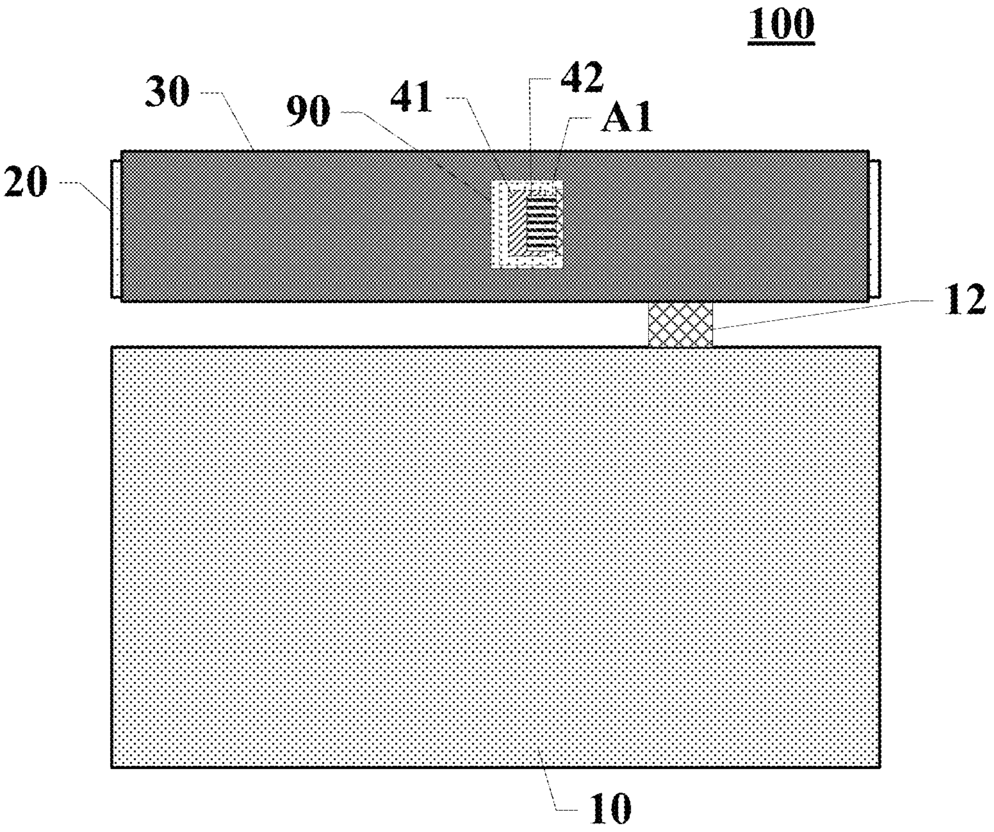
FIG. 1 is a top view of a light-emitting module according to an embodiment of the present disclosure.

Various exemplary embodiments of the present disclosure will be described in detail with reference to the accompanying drawings. It should be noted that the relative arrangement of components and steps, numerical expressions and numerical values set forth in these embodiments do not limit the scope of the present disclosure unless otherwise specifically stated.

The following description of at least one exemplary embodiment is merely illustrative and does not limit the present disclosure, application, or usages of present disclosure.

Techniques, methods, and devices known to those skilled in the art may not be provided in detail. However, such techniques, methods and devices should, where appropriate, be considered a part of the specification.

In all embodiments shown and provided herein, any specific values are to be construed as illustrative only and not as limiting. Accordingly, other exemplary embodiments may have different values.

It is apparent that various modifications and changes may be made to the present disclosure without departing from the embodiments of the present disclosure. Thus, the present disclosure is intended for covering modifications and variations made thereto, which fall within the scope of the corresponding claims (embodiments as claimed) and their equivalents. Embodiments of the present disclosure can be combined as long as they do not contradict with each other.

It should be noted that similar reference numerals and letters refer to similar items in the following drawings. Once an item is defined in one figure, there is no need to repeat in subsequent figures.

Figure 2:
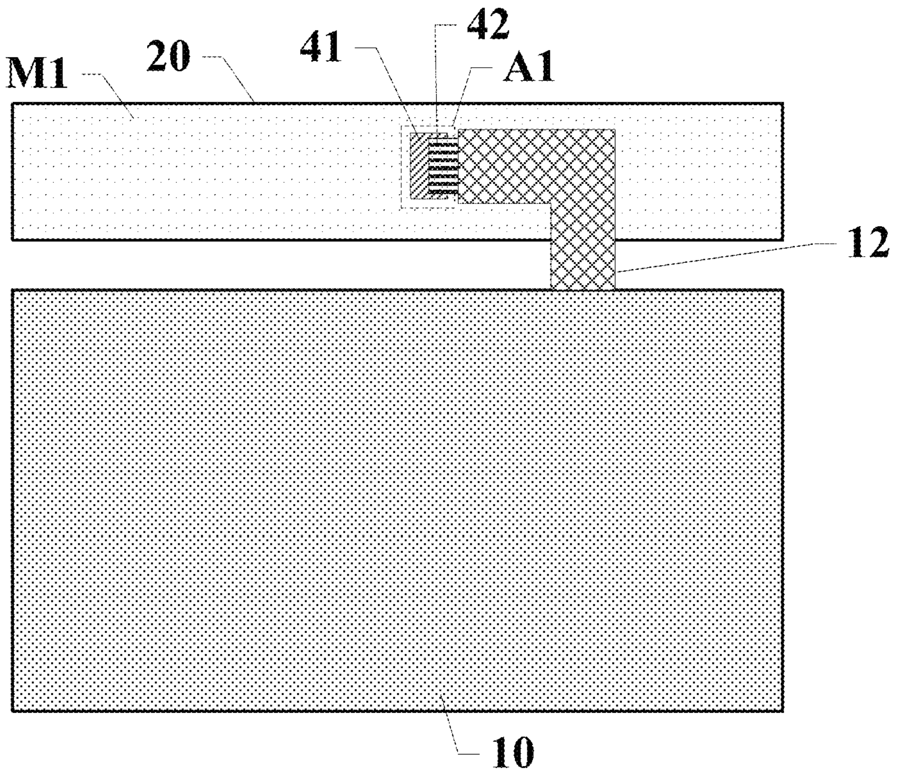
FIG. 2 is a schematic diagram of an electrical connection between a backlight module and a first circuit board in a light-emitting module according to an embodiment of the present disclosure.

FIG. 1 is a top view of a light-emitting module 100 according to an embodiment of the present disclosure. FIG. 2 is a schematic diagram of an electrical connection of a backlight module 10 and a first circuit board 20 in the light-emitting module 100 according to an embodiment of the present disclosure. To clearly show the connection relationship between the backlight module 10 and the first circuit board 20, the fixing adhesive film 30 is not shown in FIG. 2. FIG. 1 is a top view structure after the fixing adhesive film 30 and the first circuit board 20 are fixed. Reference is made to FIGS. 1 and 2, a light-emitting module 100 is provided according to an embodiment of the present disclosure. The light-emitting module 100 includes a backlight module 10 and a first circuit board 20 electrically connected to the backlight module 10. The first circuit board 20 includes a first surface M1 and at least one first electrical connection terminal 41 on the first surface M1; the backlight module 10 includes a second circuit board 12, the second circuit board 12 includes at least one second electrical connection terminal 42, the first electrical connection terminal 41 and the second electrical connection terminal 42 are electrically connected to form an electrical connection region A1 on the first surface M1. In one embodiment, the first electrical connection terminal 41 and the second electrical connection terminal 42 are electrically connected by snapping or plugging. Other feasible ways may also be configured for electrical connection, which is not specifically limited by the present disclosure. In one embodiment, the second circuit board 12 is a flexible circuit board electrically connected to the backlight module 10, and the first circuit board 20 is a PCB board that provides an electrical signal to the flexible circuit board.

The light-emitting module 100 further includes a fixing adhesive film 30. The fixing adhesive film 30 at least covers the first surface M1, the overlapping region of the second circuit board 12 and the first surface M1, and the electrical connection region A1. The fixing adhesive film 30 includes a first light-transmitting region 90, the first light-transmitting region 90 and the electrical connection region A1 are overlapped in a first direction D1. The first direction D1 is a direction perpendicular to a plane where the first circuit board 20 is located. The light-emitting module at least includes a first state, the electrical connection region A1 is visible through the first light-transmitting region 90 in the first state.

As an example, the backlight module 10 and the first circuit board 20 are provided in rectangular structures for illustration as shown in FIG. 1 and FIG. 2, which do not limit actual shapes of the backlight module 10 and the first circuit board 20. In some other embodiments of the present disclosure, the backlight module 10 and the first circuit board 20 may also be configured in other shapes according to practical requirements, which are not specifically limited by the present disclosure. In addition, the sizes of the backlight module 10 and the first circuit board 20 are only for illustration, and actual size and relative size relationship between the backlight module 10 and the first circuit board 20 are not limited in the present disclosure.

Reference is made to FIGS. 1 and 2, in the light-emitting module 100 according to an embodiment of the present disclosure, the second electrical connection terminal 42 on the second circuit board 12 in the backlight module 10 is electrically connected to the first electrical connection terminal 41 on the first circuit board 20 to form the electrical connection region A1. The electrical connection region A1 may be regarded as a region where the first electrical connection terminal 41 and the second electrical connection terminal 42 are actually electrically connected. This region includes a region where the first electrical connection terminal 41 is located and a region where the second electrical connection terminal 42 is located. The first circuit board 20 is configured to provide the electrical signal to the backlight module 10, and the reliability of the electrical connection between the two terminals in the electrical connection region A1 directly determines the light-emitting effect of the backlight module 10. In this embodiment, the electrical connection region A1 is provided as a rectangular region as an example for description, which does not limit the specific shape of the electrical connection region A1.

The light-emitting module 100 further includes a fixing adhesive film 30 covering the first circuit board 20. The fixing adhesive film 30 serves as an electromagnetic shielding function to prevent the first circuit board 20 from being interfered by external signals. In one embodiment, the fixing adhesive film 30 covers the whole first surface M1 of the first circuit board 20. In actual products, only the edge region of the fixing adhesive film 30 may be fixed to the edge region of the first surface M1 of the first circuit board 20, without bonding the middle region with adhesive. It should be noted that a part of the first circuit board 20 is extended to a periphery of the fixing adhesive film 30 in FIG. 1 to reflect the relative positional relationship between the first circuit board 20 and the fixing adhesive film 30. In fact, the fixing adhesive film 30 fully covers the first surface of the first circuit board. FIG. 2 only illustrates the first electrical connection terminal 41 on the first surface of the first circuit board 20 and does not show other structures on the first surface M1. In fact, the first surface M1 is further provided with other electronic components.

In the related technologies, when the fixing adhesive film covers the first circuit board, the fixing adhesive film is usually a black adhesive film. When the electrical connection region is fully covered by the black adhesive film, the connection status of the electrical connection region may not be inspected, resulting in the problem of missed inspection in the electrical connection region.

To solve the above problem, the fixing adhesive film 30 according to an embodiment of the present disclosure includes the first light-transmitting region 90 corresponding to the electrical connection region A1. In the first state, the electrical connection region A1 is visible through the first light-transmitting region 90. In this way, the quality inspection of the state of the above electrical connection region A1 can be achieved through visual inspection, where the connection status of the first electrical connection terminal 41 and the second electrical connection terminal 42 can be clearly viewed. Compared with the method in related technologies that cannot conduct quality inspection on the electrical connection region A1, the probability of missed inspection of products can be effectively reduced. In addition, such visual inspection method is beneficial to improving the efficiency of product quality inspection.

Figure 3:
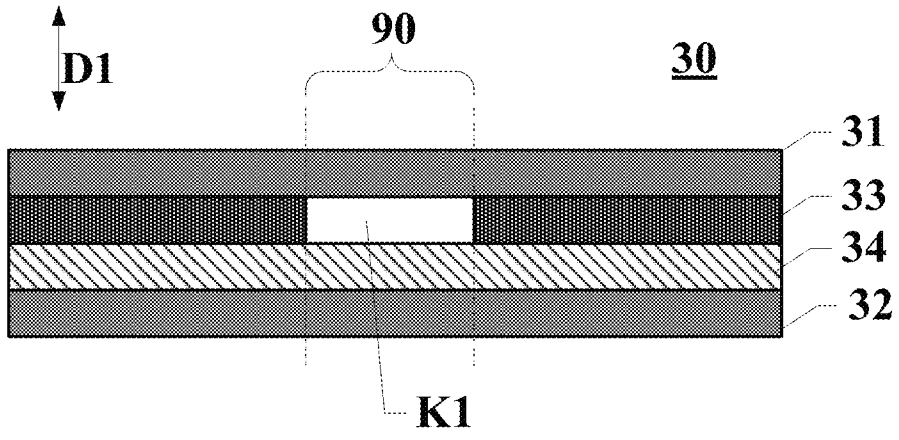
FIG. 3 is a schematic diagram of layers of a fixing adhesive film according to an embodiment of the present disclosure.
Figure 4:
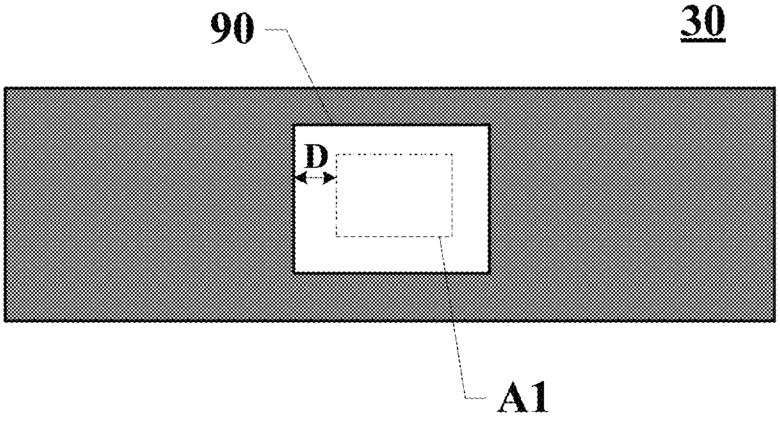
FIG. 4 is a top view of a relationship between the fixing adhesive film and the electrical connection region in FIG. 3.

FIG. 3 illustrates a schematic diagram of layers of the fixing adhesive film 30 according to an embodiment of the present disclosure. FIG. 4 illustrates a top view of the relationship between the fixing adhesive film 30 and the electrical connection region A1 in FIG. 3. Reference is made to FIGS. 3 and 4. In one embodiment of the present disclosure, when the light-emitting module only includes the first state, in the first direction D1, an outer outline of an orthographic projection of the first light-transmitting region 90 on the plane where the first circuit board 20 is located is located at the periphery of an outer outline of orthographic projection of the electrical connection region A1 on the plane where the first circuit board 20 is located, which is equivalent to expanding the orthographic projection of the first light-transmitting region 90 relative to the orthographic projection of the electrical connection region A1.

In this embodiment, the relative positional relationship between the first light-transmitting region 90 of the fixing adhesive film 30 and the electrical connection region A1 is further limited. The area of the first light-transmitting region 90 is configured to be greater than the area of the electrical connection region A1, and the first light-transmitting region 90 is expanded to a certain extent relative to the electrical connection region A1 while fully covering the electrical connection region A1. In this way, it can, to a certain extent, ensure that the electrical connection region A1 is visible through the first light-transmitting region 90 in the first state to guarantee the efficiency of quality inspection, even if a certain alignment deviation occurs while fixing the adhesive film 30 to the first surface M1 of the first circuit board 20. In addition, since the orthographic projection of the first light-transmitting region 90 is expanded relative to the orthographic projection of the electrical connection region A1, when inspecting the connection state of the electrical connection region A1 through the first light-transmitting region 90 in the visual inspection manner, the condition around the electrical connection region A1 can also be observed simultaneously, which is beneficial to increasing the scope of quality inspection to a certain extent.

Further referring to FIGS. 3 and 4, in an embodiment of the present disclosure, there is a first space between the outer outline of the first light-transmitting region 90 and the outer outline of the electrical connection region A1, and a width D of the first space ranges from 0.5 mm to 1 mm.

Given that there may be a certain alignment deviation when fixing the fixing adhesive film 30 to the first surface M1 of the first circuit board 20 and the alignment deviation is generally no greater than 0.5 mm, by configuring the width D of the first space between the outer outline of the first light-transmitting region 90 and the outer outline of the electrical connection region A1 to be greater than or equal to 0.5 mm, it ensures that the whole electrical connection region A1 is visible through the first light-transmitting region 90 in the first state to facilitate quality inspection, even if the alignment deviation occurs between the fixing adhesive film 30 and the first circuit board 20. In addition, given that a large area of the first light-transmitting region 90 may cause a great risk of light leakage from the backlight module 10 in the first light-transmitting region 90, the width D of the first space between the outer outline of the first light-transmitting region 90 and the outer outline of the electrical connection region A1 is configured to be less than or equal to 1 mm, which is beneficial to reducing the risk of light leakage in the first light-transmitting region 90. In one embodiment, D is any one of 0.5 mm, 0.6 mm, 0.7 mm, 0.8 mm, 0.9 mm and 1 mm.

Reference is made to FIGS. 3 and 4, in an embodiment, the fixing adhesive film 30 includes a first release film 31 and a second release film 32 oppositely arranged in the first direction D1, and a light-shielding adhesive layer 33 located between the first release film 31 and the second release film 32. When the light-emitting module only includes the first state, the light-shielding adhesive layer 33 includes a first opening K1, and the first opening K1 runs through the light-shielding adhesive layer 33 in the thickness direction of the light-shielding adhesive layer 33. The projection of the first light-transmitting region 90 and that of the first opening K1 are overlapped in the first direction D1.

FIG. 3 schematically shows a layer structure of the fixing adhesive film 30 according to an embodiment. The fixing adhesive film 30 includes a first release film 31, a light-shielding adhesive layer 33 and a second release film 32 stacked in the first direction D1. In an embodiment, the first release film 31 and the second release film 32 are layers with a light-transmitting effect, and the light-shielding adhesive layer 33 does not have a light-transmitting effect. The light-shielding adhesive layer 33 is located between the first release film 31 and the second release film 32 in the first direction D1. When the light-emitting module only includes the first state, the first light-transmitting region 90 of the fixing adhesive film 30 is obtained by removing a part of the light-shielding adhesive layer 33 between the first release film 31 and the second release film 32. In other words, a first opening K1 is formed on the light-shielding adhesive layer 33 and runs through the light-shielding adhesive layer 33 in the thickness direction. The region corresponding to the first opening K1 may be regarded as the first light-transmitting region 90. Since both the first release film 31 and the second release film 32 have certain light-transmitting properties, when the first opening K1 is formed on the light-shielding adhesive layer 33, an observer may observe the state of the electrical connection region A1 through the first release film 31, the first opening K1 and the second release film 32 of the first light-transmitting region 90. Such a structure is simple to manufacture, which is beneficial to simplifying the process for manufacturing the fixing adhesive film 30 with the first light-transmitting region 90.

In an embodiment, in the fixing adhesive film 30 provided in the present disclosure, the light-shielding adhesive layer 33 is a light-shielding adhesive layer 33 with conductive property. The light-shielding adhesive layer 33 is a layer in the fixing adhesive film 30 that has an electromagnetic shielding effect. In this way, the light-shielding adhesive layer 33 plays a role of light-shielding and electromagnetic shielding at the same time. There is no need to separately introduce a layer for light-shielding and a layer for electromagnetic shielding into the fixing adhesive film 30, which is beneficial to simplifying the layer structure of the fixing adhesive film 30.

Reference is made to FIG. 3. In one embodiment of the present disclosure, the fixing adhesive film 30 further includes an insulating adhesive layer 34. The insulating adhesive layer 34 is located between the light-shielding adhesive layer 33 and the second release film 32 in the first direction D1. The transparency of at least one of the first release film 31, the second release film 32 and the insulating adhesive layer 34 in the first light-transmitting region 90 is less than or equal to 50%.

When the insulating adhesive layer 34 is provided between the light-shielding adhesive layer 33 and the second release film 32, the insulating adhesive layer 34 can be configured to electrically isolate the light-shielding adhesive layer 33 and the first surface M1 of the first circuit board 20 to prevent the light-shielding adhesive layer 33 with conductive function from contacting the first surface of the first circuit board and affecting the electrical performance of the electronic components on the first surface, to facilitate the stability of the electrical performance of the first circuit board.

Layers of the fixing adhesive film 30 in the first light-transmitting region 90 includes the first release film 31, the insulating adhesive layer 34 and the second release film 32. The transparency of the light-transmitting region 90 can be adjusted by setting the transparency of these three layers. For example, when the transparency of at least one of the first release film 31, the second release film 32 and the insulating adhesive layer 34 in the first light-transmitting region 90 is set to less than or equal to 50%, the first light-transmitting region 90 may be in a translucent state, or the transparency of the first light-transmitting region 90 can be set lower without affecting the observation of the electrical connection region A1, to minimize the amount of light leakage of the backlight module 10 from the first light-transmitting region A1 and meet needs of customers who have requirements for visual light leakage. In an actual product, in a case that the first release film 31 and the second release film 32 are transparent films, the transparency of the first light-transmitting region 90 may be adjusted by adjusting the transparency of the insulating adhesive layer 34. In one embodiment, the insulating adhesive layer 34 includes PET material. When the transparency of the first light-transmitting region 90 is required to be reduced, the insulating adhesive layer 34 may use a translucent PET material. When the transparency of the first light-transmitting region 90 is further reduced, the PET material may be replaced with other dark-colored light-transmitting films.

In a case that there is no requirement for the visual light leakage of the first light-transmitting region 90, the transparency of the first light-transmitting region 90 may be set higher, to facilitate observing the state of the electrical connection region A1 and improve the efficiency of quality inspection.

Figure 5:
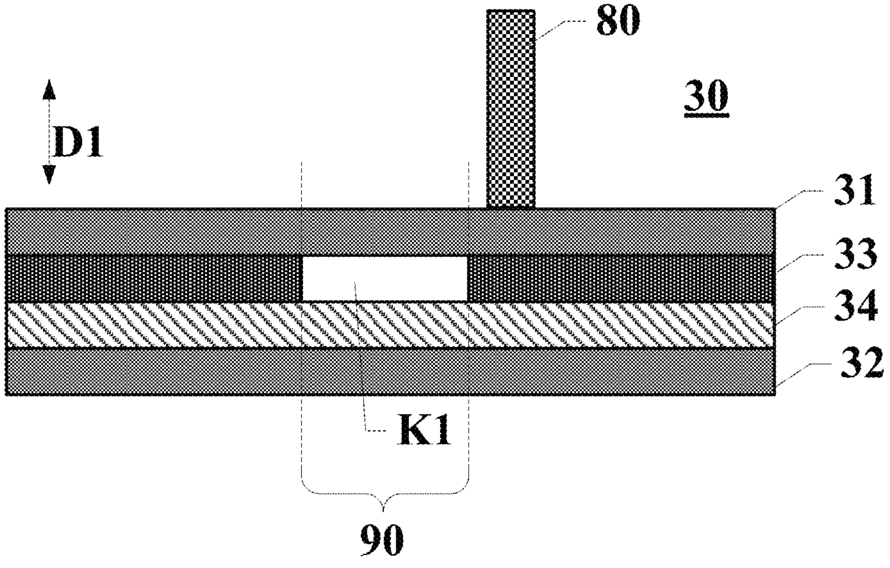
FIG. 5 is a diagram of a relative positional relationship of a fixing adhesive film and a light-shielding closure according to an embodiment of the present disclosure.
Figure 6:
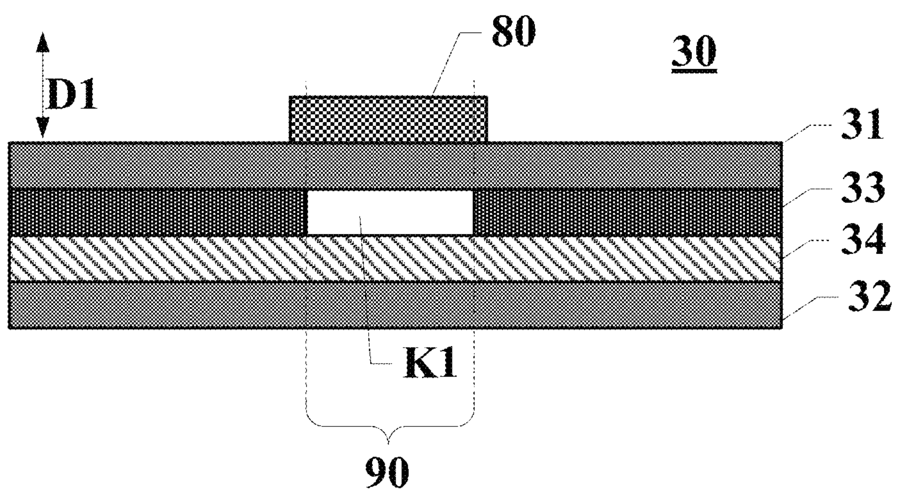
FIG. 6 is a diagram of a relative positional relationship of a fixing adhesive film and a light-shielding closure according to another embodiment of the present disclosure.

The above embodiment illustrates a solution in which the light-emitting module only includes the first state. In this solution, the existence of the first light-transmitting region enables the quality inspector to visually inspect the state of the electrical connection region A1 through the first light-transmitting region 90 at all times. In some other embodiments of the present disclosure, the light-emitting module may further include a second state. Reference is made to FIG. 5. FIG. 5 is a diagram of a relative position relationship of a fixing adhesive film 30 and a light-shielding closure 80 according to an embodiment of the present disclosure. FIG. 6 is a diagram of a relative position relationship of a fixing adhesive film 30 and a light-shielding closure 80 according to another embodiment of the present disclosure.

Reference is made to FIGS. 5 and 6. FIG. 5 corresponds to the first state of the light-emitting module, while FIG. 6 corresponds to the second state of the light-emitting module. In one embodiment of the present disclosure, the light-emitting module further includes a light-shielding closure 80; the light-emitting module further includes a second state. In the second state, the light-shielding closure 80 covers the first light-transmitting region 90.

Compared with the embodiment shown in FIG. 3, in this embodiment, a light-shielding closure 80 is provided. In the first state, as shown in FIG. 5, the light-shielding closure 80 may be opened, and the first light-transmitting region 90 or at least part of the first light-transmitting region 90 is not covered by the light-shielding closure 80. In this case, the electrical connection region A1 is visible through the first light-transmitting region 90. Quality inspection may be performed on the state of the electrical connection region A1 through the first light-transmitting region 90, the first state is suitable for the process of quality inspection. When the quality inspection is not required or is completed, the light-emitting module enters the second state. As shown in FIG. 6, in the second state, the light-shielding closure 80 covers the first light-transmitting region 90 to prevent the light emitted by the backlight module 10 from leaking via the first light-transmitting region 90, which is especially suitable for the higher requirements for visual light leakage. By providing the light-shielding closure 80 in the embodiment, the light-emitting module may be switched between the first state and the second state to meet usage requirements of different scenarios.

The embodiments of FIGS. 5 and 6 show a solution of providing the light-shielding closure 80 based on the embodiment of FIG. 3. In this case, the formation of the first light-transmitting region 90 may be obtained by removing a part of the light-shielding adhesive layer 33, for example, using the structure of the embodiment shown in FIG. 3. In one embodiment, the light-shielding closure 80 is a structure independent of the fixing adhesive film 30, which may enable the first light-transmitting region 90 visible in the first state and cover the first light-transmitting region 90 in the second state.

Figure 7:
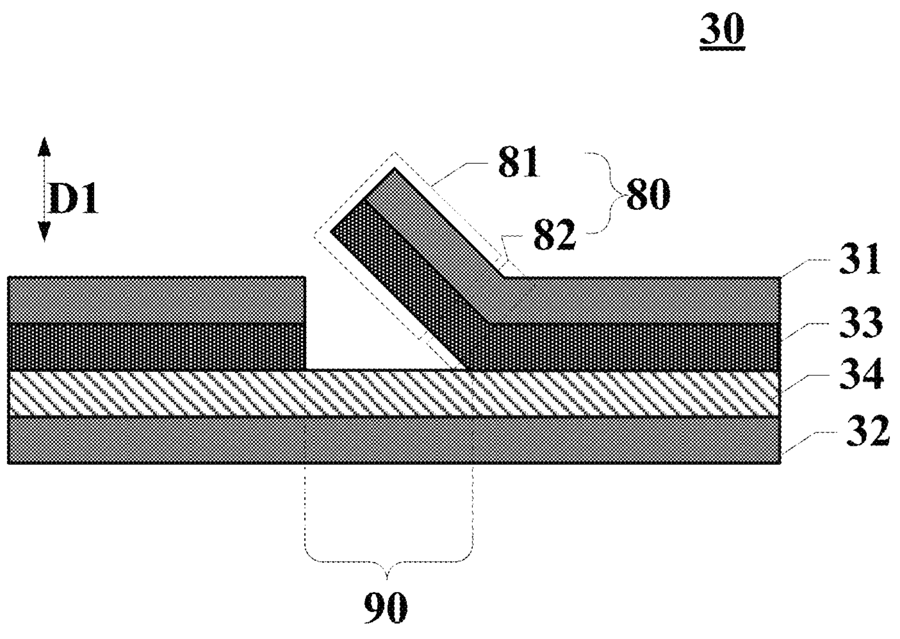
FIG. 7 is a diagram of a relative positional relationship of a fixing adhesive film and a light-shielding closure according to another embodiment of the present disclosure.
Figure 8:
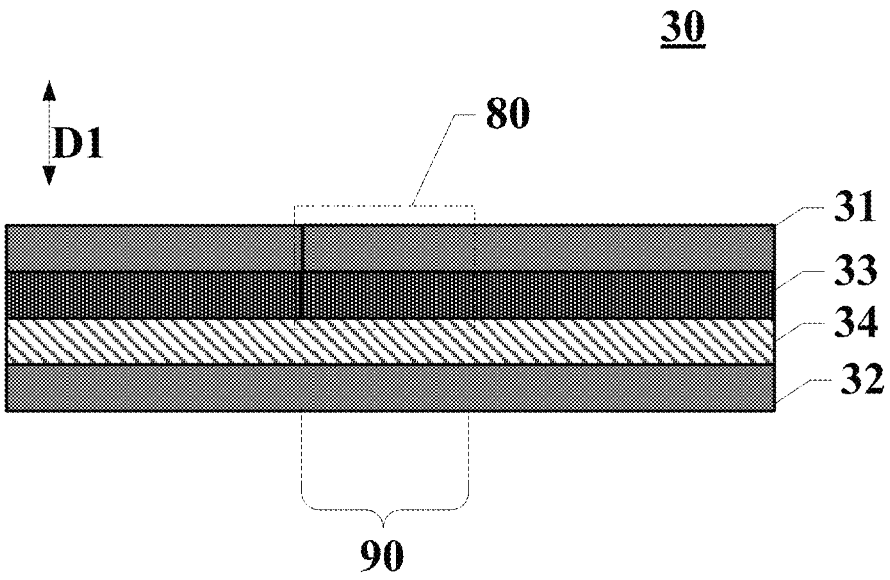
FIG. 8 is a diagram of a relative positional relationship of a fixing adhesive film and a light-shielding closure according to another embodiment of the present disclosure.

In some other embodiments of the present disclosure, at least part of the layers of the fixing adhesive film 30 are used as the light-shielding closure 80. Reference is made to FIGS. 7 and 8. FIG. 7 is a diagram of a relative positional relationship of the fixing adhesive film 30 and the light-shielding closure 80 according to an embodiment of the present disclosure, which corresponds to the first state of the light-emitting module. FIG. 8 is a diagram of a relative positional relationship of the fixing adhesive film 30 and the light-shielding closure 80 according to another embodiment of the present disclosure, which corresponds to the second state of the light-emitting module. In one embodiment, the light-shielding closure 80 reuses a part of the layers of the fixing adhesive film 30. In this way, there is no need to introduce other structures into the light-emitting module to manufacture the light-shielding closure 80, which is beneficial to simplifying the overall structure of the light-emitting module. When at least a part of the layers of the fixing adhesive film 30 is used as the light-shielding closure 80, in the first state, at least a part of the layers of the fixing adhesive film 30 reused as the light-shielding closure 80 does not cover the first light-transmitting region 90, and the electrical connection region A1 is visible to meet the demand for quality inspection of the state of the electrical connection region; in the second state, the layers of the fixing adhesive film 30 reused as the light-shielding closure 80 covers the first light-transmitting region 90, and the electrical connection region is invisible, to prevent the light emitted by the backlight module 10 from leaking through the first light-transmitting region 90.

Reference is made to FIGS. 7 and 8 in combination with FIGS. 1 and 2. In an embodiment of the present disclosure, the fixing adhesive film 30 includes a first release film 31 and a first release film 31 that are oppositely arranged in the first direction D1, and a light-shielding adhesive layer 33 located between the first release film 31 and the second release film 32. The first release film 31 is located on a side of the second release film 32 facing away from the first surface M1 of the first circuit board 20. The light-shielding closure 80 includes a folding portion 81 and a connecting portion 82 connected to the folding portion 81. The folding portion 81 is folded using the connecting portion 82 as a pivot. The folding portion 81 at least includes the first release film 31 and the light-shielding adhesive layer 33, the connecting portion 82 at least includes the first release film 31. In an embodiment, the connecting portion 82 includes the layers consistent with the folding portion 81, when the folding portion 81 includes the first release film 31 and the light-shielding adhesive layer 33, the connection portion 82 may include the first release film 31 and the light-shielding adhesive layer 33. In the first state, the folding portion 81 uses the connecting portion 82 as the pivot and is folded towards a side away from the electrical connection region A1 to form the first light-transmitting region 90. In the second state, the projection of the light-shielding adhesive layer 33 in the folding portion 81 covers the first light-transmitting region 90 in the first direction D1.

Figure 9:
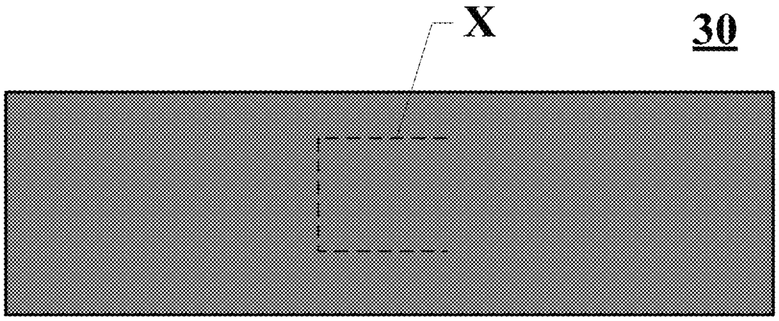
FIG. 9 is a top view of a fixing adhesive film according to an embodiment of the present disclosure.

This embodiment illustrates the structure when the light-shielding closure 80 reuses at least a part of the layers of the fixing adhesive film 30. When forming the light-shielding closure 80 on the fixing adhesive film 30, the light-shielding closure 80 may be formed through cutting at least a part of the layers of the fixing adhesive film 30 above the electrical connection region A1. Reference is made to FIG. 9. FIG. 9 is a top view of the fixing adhesive film 30 according to an embodiment of the present disclosure. The dashed line may be regarded as a cutting line X. During actual cutting, the first release film 31 and the light-shielding adhesive layer 33 may be cut along the cutting line X to form the connecting portion 82 and the folding portion 81. An edge of the folding portion 81 corresponds to the cutting line X. The folding portion 81 may be folded towards a side away from the electrical connection region A1 with the connecting portion 82 as the pivot (or rotating axis). In this case, the light-emitting module is in the first state and the electrical connection region A1 is visible. The folding portion 81 may further be flipped above the first light-transmitting region 90 and cover the first light-transmitting region 90 with the connecting portion 82 as the pivot. In this case, the light-emitting module is in the second state, and the light-shielding adhesive layer 33 in the folding portion 81 plays a light-shielding role to prevent the light emitted by the backlight module from leaking through the first light-transmitting region 90. In an embodiment, in the second state, the light-shielding adhesive layer 33 in the light-shielding closure 80 aligns with the light-shielding adhesive layer 33 in other regions of the fixing adhesive film 30. The first release film 31 in the light-shielding closure 80 aligns with the first release films 31 in other regions of the fixing adhesive film 30. In this embodiment, the light-shielding closure 80 reuses the light-shielding adhesive layer 33 and the first release film 31 in the fixing adhesive film 30. The structural characteristics of the fixing adhesive film 30 are rationally utilized, the quality inspection and light leakage prevention requirements of the electrical connection region A1 of the light-emitting module are met, and the layer structure of the light-emitting module is simplified.

Figure 10:
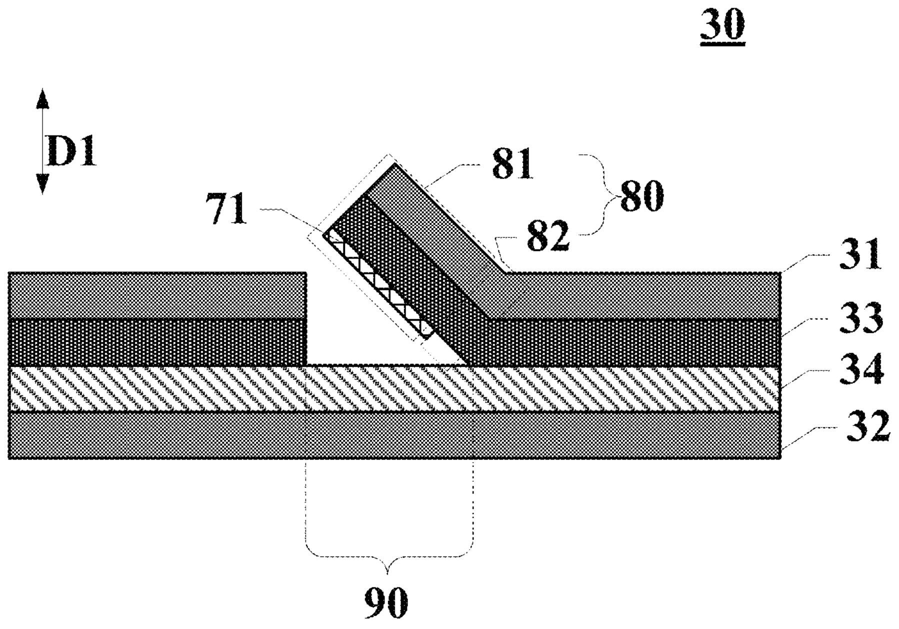
FIG. 10 is a diagram of a relative positional relationship of a fixing adhesive film and a light-shielding closure according to another embodiment of the present disclosure.

FIG. 10 is a diagram of a relative positional relationship of the fixing adhesive film 30 and the light-shielding closure 80 according to another embodiment of the present disclosure. As shown in FIG. 10, in one embodiment, the light-shielding closure 80 further includes a first isolation portion 71 located at least on a surface of the light-shielding closure 80 away from the first release film 31.

This embodiment shows a solution of providing the first isolation portion 71 on the surface of the light-shielding closure 80 facing away from the first release film 31. In one embodiment, the first isolation portion 71 may also be made of a release film. The first isolation portion 71 has no adhesiveness. In the second state of the light-emitting module, the surface of the light-shielding closure 80 provided with the first isolation portion 71 may be regarded as the surface of the light-shielding closure 80 facing the electrical connection region A1. In this way, in the second state, the first isolation portion 71 may be located between the insulating adhesive layer 34 in the fixing adhesive film 30 and other layers of the light-shielding closure 80 to eliminate the problem that the light-shielding closure 80 is difficult to fold when the insulating adhesive layer 34 is in direct contact with other adhesive layers in the light-shielding closure 80. Therefore, it is beneficial to improve the operational convenience of switching the light-emitting module between the second state and the first state.

Figure 11:
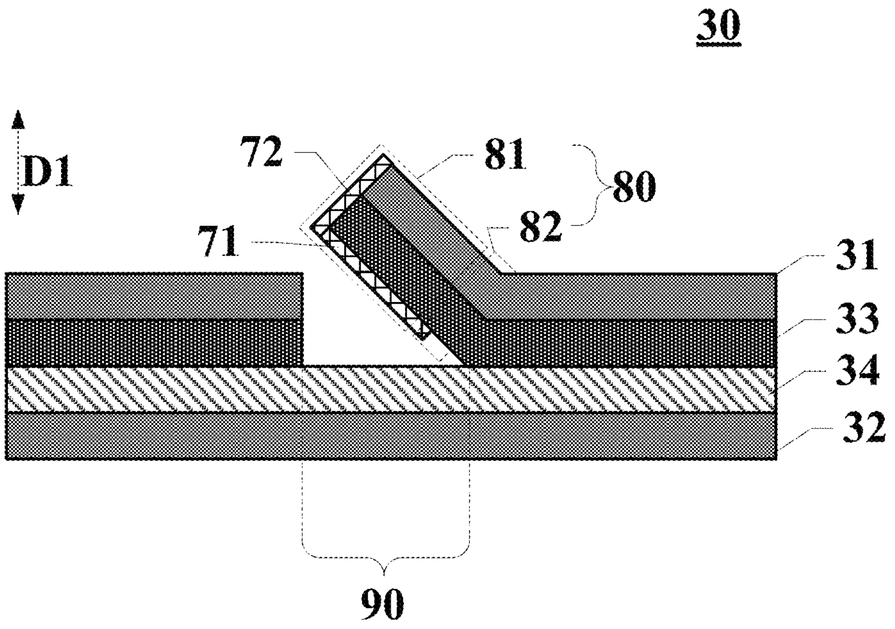
FIG. 11 is a diagram of a relative positional relationship of a fixing adhesive film and a light-shielding closure according to another embodiment of the present disclosure.

FIG. 11 is a diagram of a relative positional relationship of the fixing adhesive film 30 and the light-shielding closure 80 according to another embodiment of the present disclosure. Reference is made to FIG. 11, in one embodiment of the present disclosure, the light-shielding closure 80 further includes a second isolation portion 72 located at least on the side surface of the light-shielding adhesive layer 33 in the light-shielding closure 80.

When the light-shielding closure 80 reuses a part of the layers of the fixing adhesive film 30, the light-shielding closure 80 is obtained by cutting a part of the layers of the fixing adhesive film 30. Since the light-shielding adhesive layer 33 belongs to the cut layer, the side surface of the light-shielding closure 80 contains the light-shielding adhesive layer 33. When the second isolation film is provided on the side surface of the light-shielding closure 80 in this embodiment, it can prevent the side surface of the light-shielding adhesive layer 33 in the light-shielding closure 80 from being directly in contact with the side surface of the light-shielding adhesive layer 33 in other regions of the fixing adhesive film 30 in the second state, to eliminate the problem that the light-shielding closure 80 is difficult to fold due to the tight adhesion of the light-shielding adhesive layer 33. Hence, it is beneficial to improve the operational convenience of the light-emitting module switching between the second state and the first state. It should be noted that, in order to ensure that the light-shielding closure 80 may smoothly switch from the first state to the second state with the second isolation portion 72 on the side surface of the light-shielding closure 80, at least a part of the sidewall of the light-shielding closure 80 may be removed while forming the light-shielding closure 80 by cutting, to leave a space for the second isolation portion 72.

Figure 12:
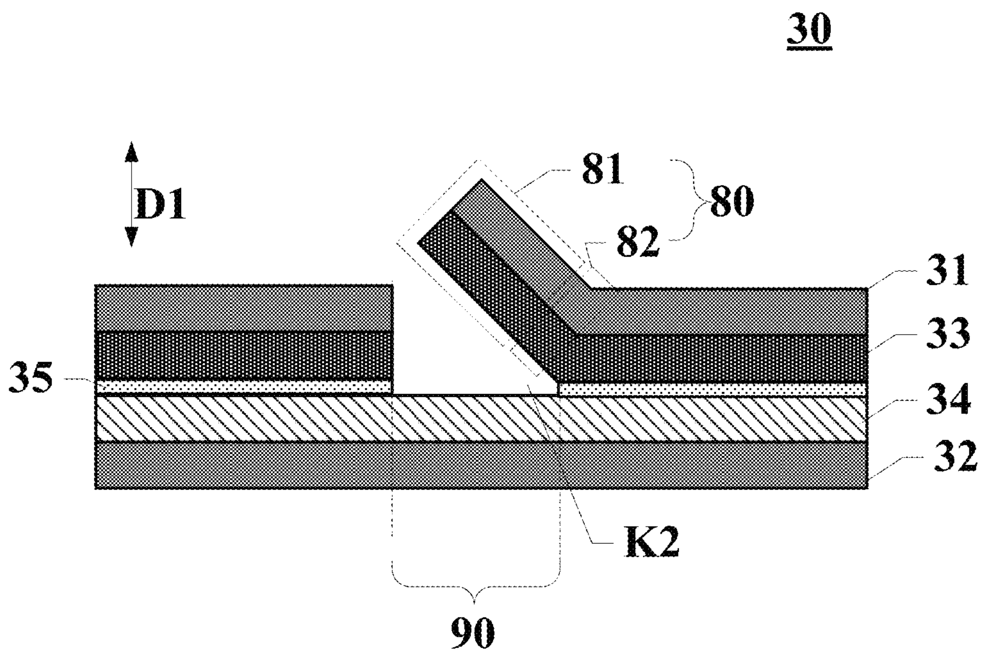
FIG. 12 is a diagram of a relative positional relationship of a fixing adhesive film and a light-shielding closure according to another embodiment of the present disclosure.
Figure 13:
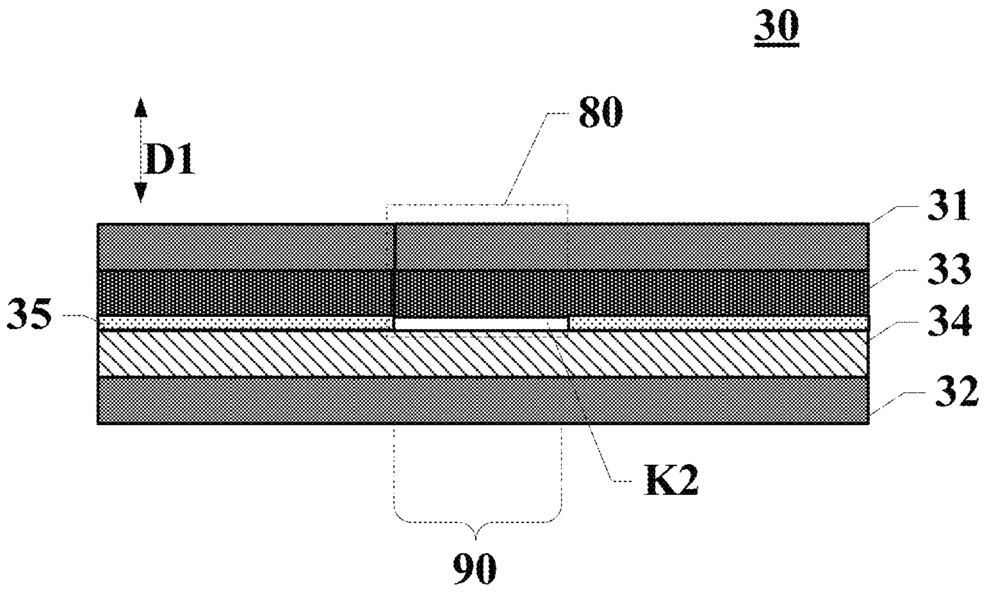
FIG. 13 is a diagram of a relative positional relationship of a fixing adhesive film and a light-shielding closure according to another embodiment of the present disclosure.

FIG. 12 is a diagram of a relative positional relationship of the fixing adhesive film 30 and the light-shielding closure 80 according to another embodiment of the present disclosure, which corresponds to the first state of the light-emitting module. FIG. 13 is a diagram of a relative positional relationship of the fixing adhesive film 30 and the light-shielding closure 80 according to another embodiment of the present disclosure, which corresponds to the second state of the light-emitting module. Compared with embodiments of FIGS. 7 and 8, the first adhesive layer 35 is provided in this embodiment. Reference is made to FIGS. 12 and 13, in one embodiment of the present disclosure, the fixing adhesive film 30 further includes the insulating adhesive layer 34 and the first adhesive layer 35, the insulating adhesive layer 34 and the first adhesive layer 35 are located between the light-shielding adhesive layer 33 and the second release film 32, and the insulating adhesive layer 34 is located between the first adhesive layer 35 and the second release film 32. The first adhesive layer 35 includes a second opening K2, the second opening K2 runs through the first adhesive layer 35 in the first direction D1, and the projection of the second opening K2 and that of the first light-transmitting region 90 are overlapped.

In addition to the first release film 31, the second release film 32 and the light-shielding adhesive layer 33, this embodiment shows a solution in which the fixing adhesive film 30 further includes an insulating adhesive layer 34 and a first adhesive layer 35. The insulating adhesive layer 34 and the first adhesive layer 35 are located on the side surface of the light-shielding adhesive layer 33 facing the second release film 32, and the first adhesive layer 35 is located between the light-shielding adhesive layer 33 and the second release film 32. The configuration of the first adhesive layer 35 between the light-shielding adhesive layer 33 and the insulating adhesive layer 34 increases a vertical distance between the light-shielding adhesive layer 33 and the insulating adhesive layer 34. In the first light-transmitting region 90, the first adhesive layer 35 includes the second opening K2 running through the first adhesive layer 35. Further referring to FIGS. 1 and 2, in the second state of the light-emitting module, the second opening K2 is located between the surface (assumed to be the lower surface) of the light-shielding closure 80 facing the electrical connection region A1 and the surface of the insulating adhesive layer 34 facing the light-shielding closure 80, which serves as a gap between the light-shielding closure 80 and the insulating adhesive layer 34, which is beneficial to eliminate the problem that the light-shielding closure 80 is difficult to tear off due to the adhesion of the light-shielding closure 80 and the insulating adhesive layer 34, to further improve the operation convenience of the light-emitting module switching between the second state and the first state. In the second state of the light-emitting module, the light-shielding closure 80 covers the first light-transmitting region 90, which is helpful to prevent the light of the backlight module 10 from leaking through the first light-transmitting region 90. In the first state of the light-emitting module, the light-shielding closure 80 is folded to enable the electrical connection region A1 to be visible, to meet the quality inspection requirements of the electrical connection region A1.

Figure 14:
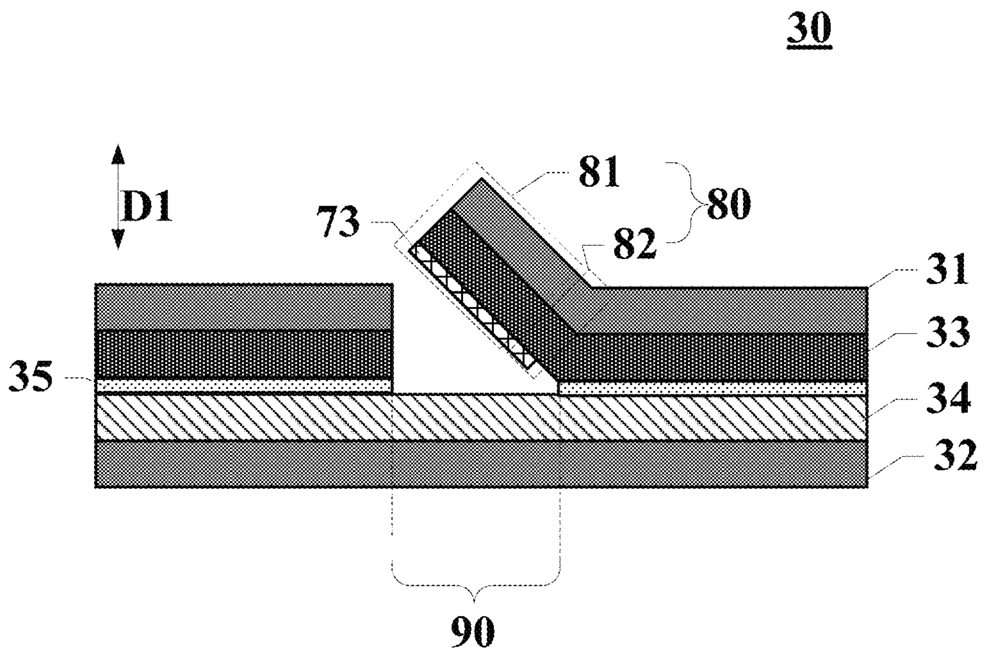
FIG. 14 is a diagram of a relative positional relationship of a fixing adhesive film and a light-shielding closure according to another embodiment of the present disclosure.
Figure 15:
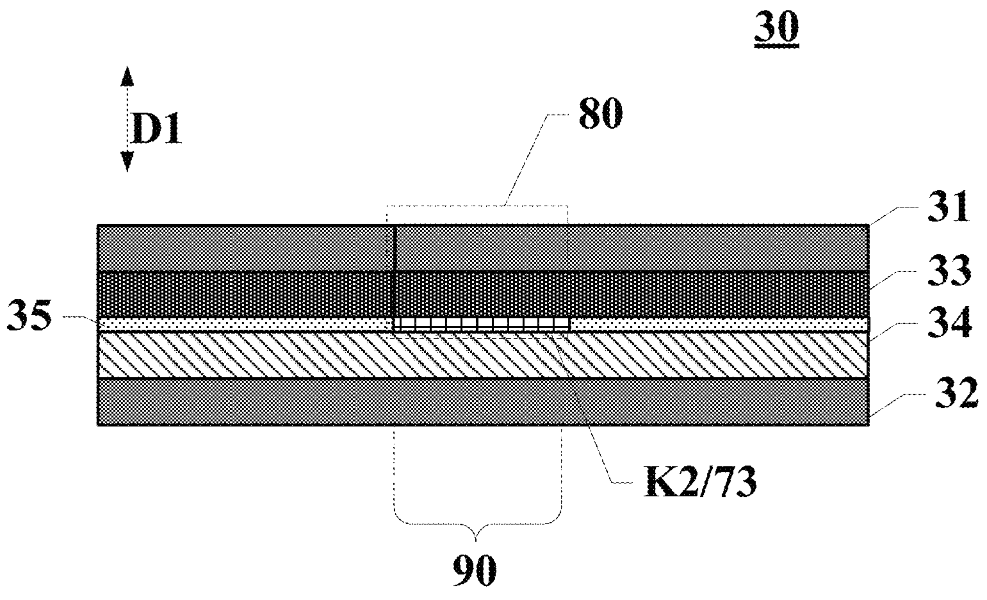
FIG. 15 is a diagram of a relative positional relationship of a fixing adhesive film and a light-shielding closure according to another embodiment of the present disclosure.

FIGS. 14 and 15 illustrate diagrams of relative positional relationships of the fixing adhesive film 30 and the light-shielding closure 80 according to another embodiment of the present disclosure, which correspond to the first state and the second state of the light-emitting module respectively. Compared with FIGS. 12 and 13, a third isolation portion 73 is provided. Reference is made to FIGS. 14 and 15, in one embodiment of the present disclosure, the light shielding closure 80 includes a third isolation portion 73, and the third isolation portion 73 is at least located on a side surface of the light-shielding adhesive layer 33 in the light-shielding closure 80 facing away from the first release film 31.

In this embodiment, a third isolation portion 73 is provided on the light-shielding closure 80. In the second state of the light-emitting module, the third isolation portion 73 is located between other layers (e.g. light-shielding adhesive layer 33) other than the third isolation portion 73 in the light-shielding closure 80 and the insulating adhesive layer 34 in the fixing adhesive film 30 and is located in the region corresponding to the second opening K2. The third isolation portion 73 is non-adhesive, which can prevent the problem that the light-shielding closure 80 is difficult to tear off due to a direct contact between the adhesive layer in the light-shielding closure 80 and the insulating adhesive layer 34 in the fixed adhesive layer 30. By configuring the third isolation portion 73 on the side surface of the light-shielding closure 80 away from the first release film 31, it is beneficial to improving the operational convenience of the light-emitting module switching between the second state and the first state.

Figure 16:
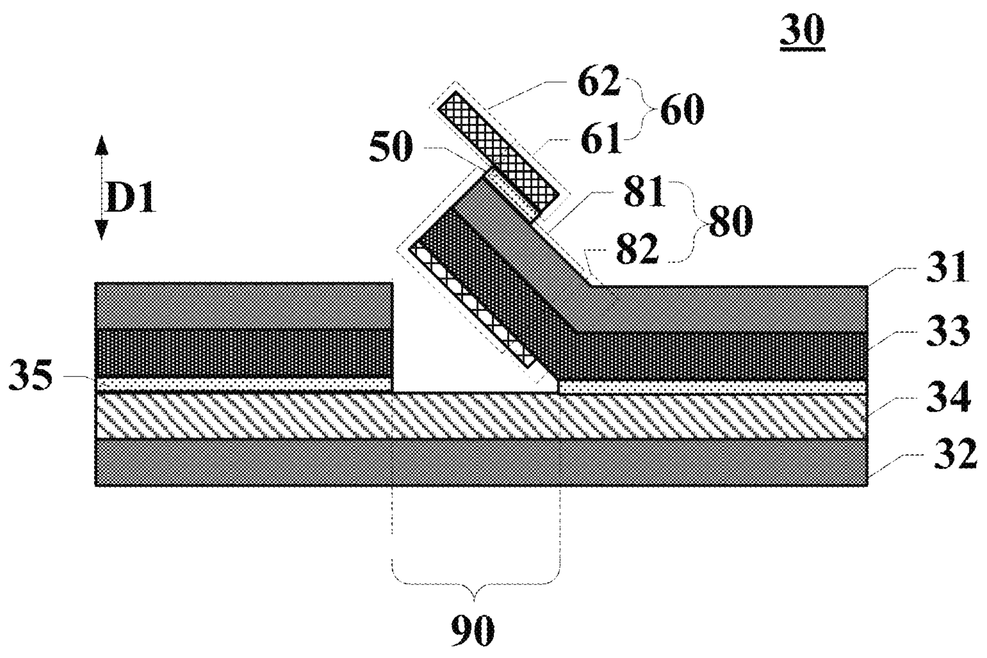
FIG. 16 is a structural schematic diagram of a light-emitting module providing with a tearing portion according to an embodiment of the present disclosure.
Figure 17:
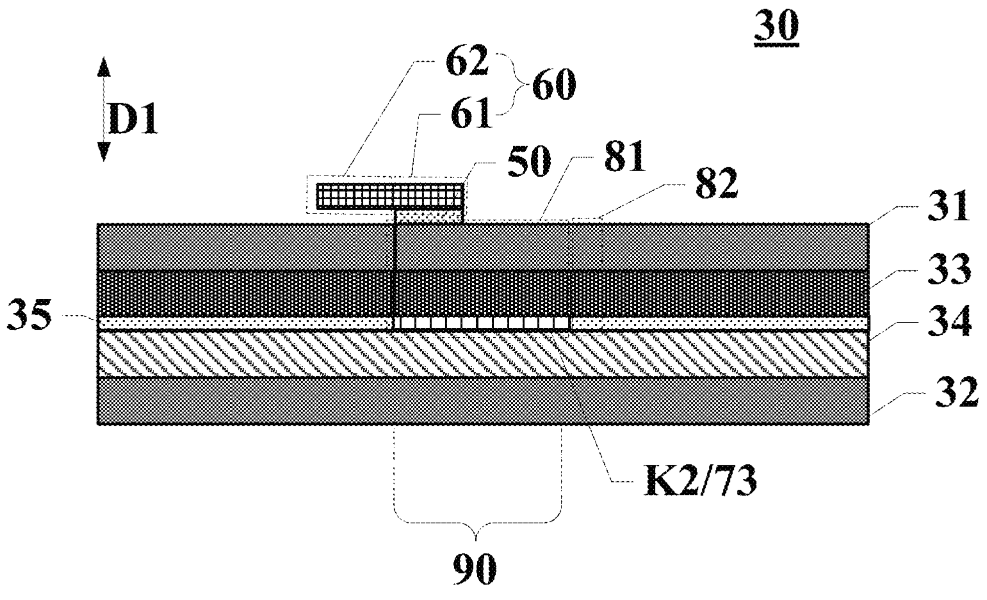
FIG. 17 is a structural schematic diagram of a light-emitting module providing with a tearing portion according to another embodiment of the present disclosure.

FIGS. 16 and 17 illustrate structural schematic diagrams of a light-emitting module providing with a tearing portion 60, which correspond to the first state and the second state of the light-emitting module respectively. Reference is made to FIGS. 16 and 17, in one embodiment of the present disclosure, the light-emitting module further includes a tearing portion 60, the tearing portion 60 is located on a side of the first release film 31 in the folding portion 81 away from the light-shielding adhesive layer 33, and the tearing portion 60 and the folding portion 81 are fixed.

This embodiment shows a solution of providing a tearing portion 60 for the light-shielding closure 80. The tearing portion 60 is fixed to the first release film 31 in the folding portion 81 and is located on the surface of the first release film 31 away from the light-shielding adhesive layer 33. In the first state, the tearing portion 60 drives the light-shielding closure 80 to flip towards a direction away from the second release film 32. In the second state, at least a part of region of the tearing portion 60 is parallel with the plane where the second release film 32 is located. When the tearing portion 60 is provided, the operator can switch the folding portion 81 between the first state and the second state by applying force to the tearing portion, which is beneficial to improving the operational convenience for the operator.

Reference is made to FIGS. 16 and 17. In one embodiment of the present disclosure, the tearing portion 60 includes a first part 61 and an extension part 62 connected to the first part 61. The first part 61 and the folding portion 81 are fixed, in the second state, the extension part 62 is at least located on the side of the first part 61 away from the connecting portion 82.

This embodiment describes the specific structure of the tearing portion 60. The tearing portion 60 includes a first part 61 fixed to the folding portion 81 and an extension part 62 located on the side of the first part 61 away from the connecting portion 82. In one embodiment, the first part 61 and the tearing portion 60 are integrally formed. During quality inspection of the electrical connection region A1, the operator can apply an upward pulling force to the extension part 62 to enable the folding portion 81 to flip away from the second release film 32, and the electrical connection region A1 is visible, i.e., the first state is entered. After the quality inspection is completed, the operator can apply force to the extension part 62 to move it towards the direction of the second release film 32 and cover the first light-transmitting region 90, to prevent the light from the backlight module 10 from leaking through the first light-transmitting region 90. When providing the tearing portion 60 with the extension part 62, the operator can apply force to the extension part 62 using tools such as tweezers, which makes the operation simpler and facilitates improving the operational convenience of the light-emitting module switching between the first state and the second state.

Further referring to FIGS. 16 and 17, in one embodiment of the present disclosure, the first part 61 is fixed to the folding portion 81 through a first adhesive 50; in the second state, in the first direction D1, the projection of at least a part of the extension part 62 does not overlap with the projection of the first adhesive 50. In this way, in the second state, at least a part of the region between the extension part 62 and the first release film 31 surrounding the first light-transmitting region 90 is not filled with the first adhesive 50. In a case that the space between the extension part 62 and the first release film 31 is completely filled with the first adhesive 50, the operator is required to apply considerable force to separate the extension part 62 from the first release film 31 in a case of switching the second state of the light-emitting module to the first state, which compromises the efficiency of quality inspection. Therefore, in one embodiment of the present disclosure, in the second state, the projection of at least a part of the extension part 62 does not overlap with the first adhesive 50, the operator can easily apply an upward pulling force to the extension part 62 when performing quality inspection on the electrical connection region A1, which is conductive to improving the operational convenience of switching from the second state of the light-emitting module to the first state.

Figure 18:
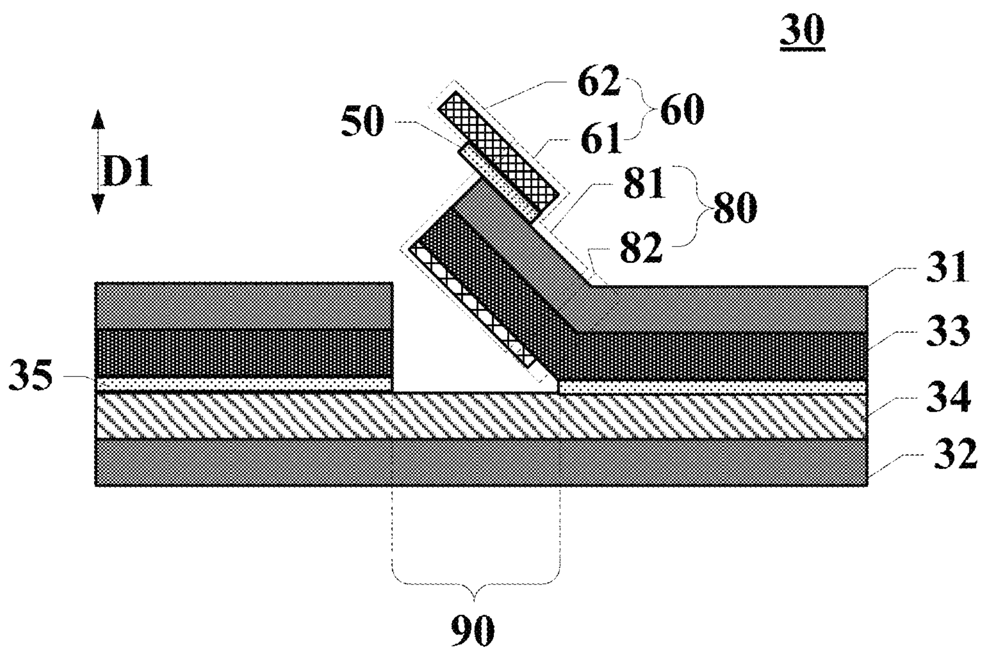
FIG. 18 is a structural schematic diagram of a light-emitting module providing with a tearing portion according to another embodiment of the present disclosure.
Figure 19:
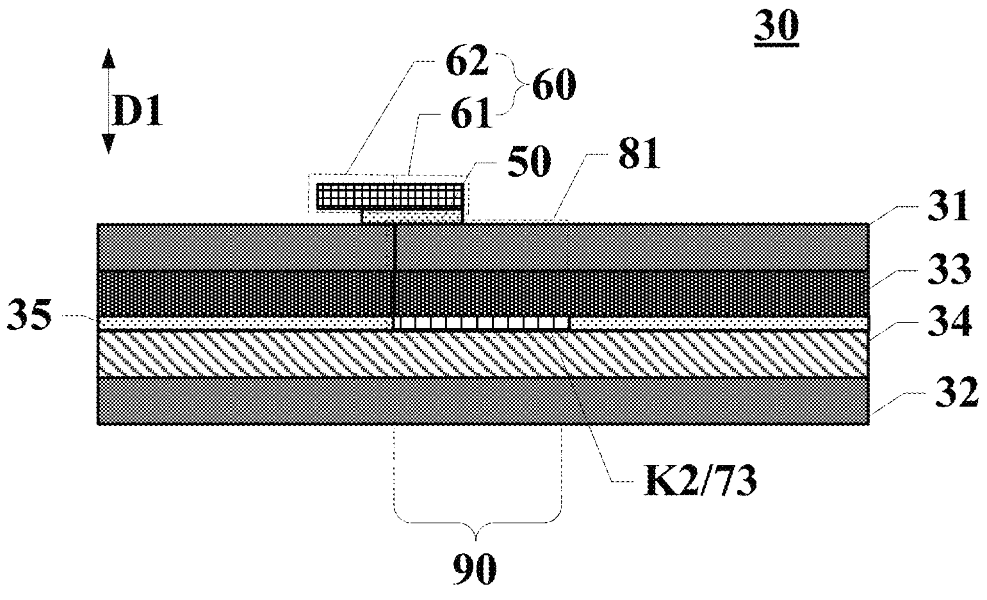
FIG. 19 is a structural schematic diagram of a light-emitting module providing with a tearing portion according to another embodiment of the present disclosure.

FIGS. 18 and 19 illustrate structural schematic diagrams of a light-emitting module providing with a tearing portion 60, which correspond to the first state and the second state of the light-emitting module respectively. Reference is made to FIGS. 18 and 19, in one embodiment of the present disclosure, in the second state, the first adhesive 50 and a part of the first release film 31 surrounding the first light-transmitting region 90 are overlapped in the first direction D1.

In one embodiment of the present disclosure, when the tearing portion 60 and the first release film 31 on the light-shielding closure 80 are fixed by the first adhesive 50, in addition to the first adhesive 50 between the first part 61 and the first release film 31, the first adhesive 50 is further extended towards the direction of the extension part 62. In this way, when quality inspection is not required, the light-emitting module is in the second state. In this case, the first adhesive 50 can fix at least part of the extension part 62 to the first release film 31 surrounding the first light-transmitting region 90. This part of the first adhesive 50 is equivalent to fixing the light-shielding closure 80 to eliminate the problem that the electrical connection region A1 would be visible if the light-shielding closure 80 were folded in the second state, which is beneficial to preventing the light leakage problem caused by folding the light-shielding closure 80 accidentally when quality inspection is not required.

Figure 20:
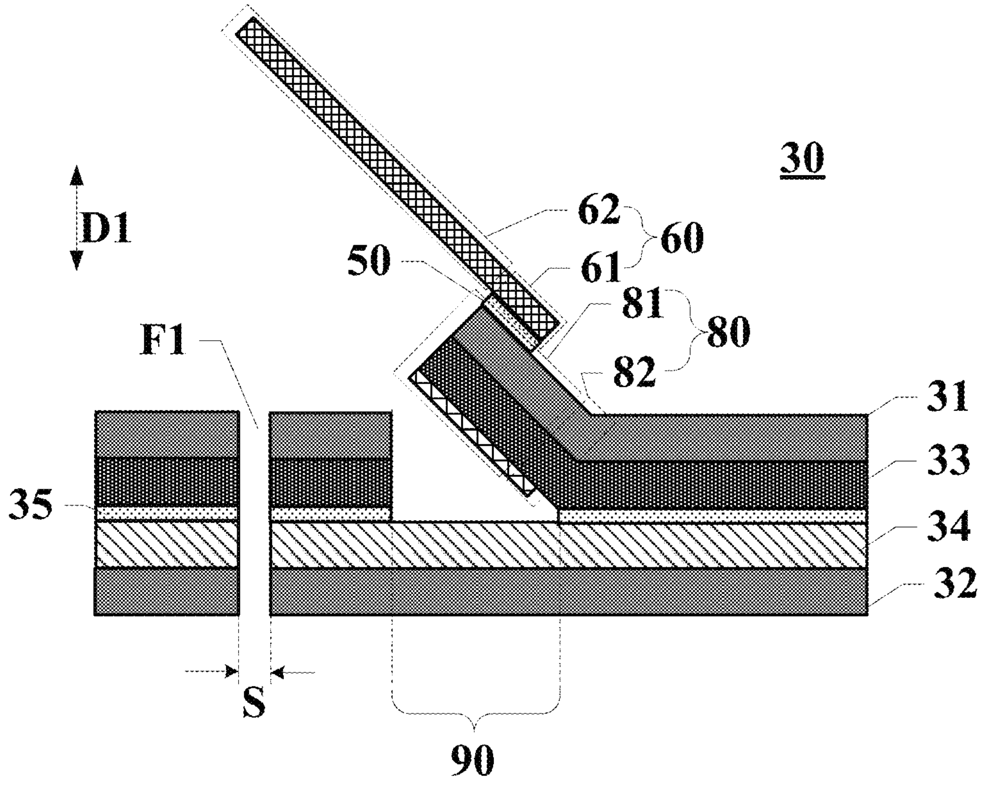
FIG. 20 is a diagram of a relative positional relationship of a tearing portion and a fixing adhesive film according to an embodiment of the present disclosure.
Figure 21:
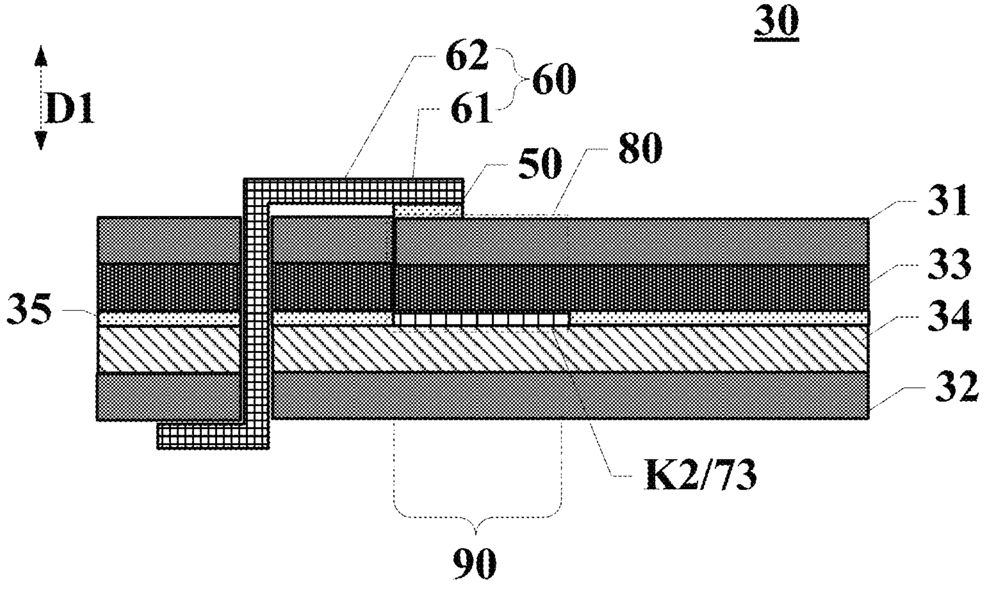
FIG. 21 is a diagram of a relative positional relationship of a tearing portion and a fixing adhesive film according to another embodiment of the present disclosure.

The above embodiment shows the manner of fixing the light-shielding closure 80 through the first adhesive 50 in the second state. In some other embodiments of the present disclosure, other feasible manner can be configured to fix the light-shielding closure 80. Reference is made to FIGS. 20 and 21. FIGS. 20 and 21 illustrate diagrams of relative positional relationships of the tearing portion and the fixing adhesive film 30 according to the embodiment of the present disclosure, respectively corresponding to the first state and the second state of the light-emitting module. In one embodiment of the present disclosure, the fixing adhesive film 30 surrounding the first light-transmitting region 90 includes a first slit F1. In the first direction D1, the first slit F1 at least runs through the fixing adhesive film 30. In the second state, the extension part 62 is inserted into the first slit F1.

This embodiment shows another solution for fixing the light-shielding closure 80. A first slit F1 is formed on the fixing adhesive film 30 on the periphery of the first light-transmitting region 90. In the second state, the first slit F1 is located on the side of the first part 61 facing the extension part 62, i.e., the first slit F1 is located in the extending direction of the extension part 62 away from the first part 61. In the first direction D1, the first slit F1 runs through all layers of the fixing adhesive film 30. Reference is made to FIGS. 1 and 2, generally, the electrical connection region A1 formed by the backlight module 10 and the first circuit board 20 is located in the non-edge region of the first circuit board 20. When the first surface M1 is covered by the fixing adhesive film 30, the edge region of the fixing adhesive film 30 is fixed to the edge region of the first surface M1. At the middle position of the first surface M1, the fixing adhesive film 30 is not adhered to the first surface M1. Therefore, when the extension part 62 descends and runs through the first slit F1 in the second state, a terminal of the extension part 62 may further insert into the space between the fixing adhesive film 30 and the first surface M1, to reliably fixe the light-shielding closure 80, which is beneficial to eliminating the problem that the electrical connection region A1 would be visible if the light-shielding closure 80 were folded in the second state, to prevent the light leakage problem caused by folding the light-shielding closure 80 accidentally when quality inspection is not required.

In a case of fixing the light-shielding closure 80 by configuring the first slit F1 with the extension part 62, the first adhesive 50 between the tearing portion 60 and the light-shielding closure 80 only needs to be disposed between the first part 61 and the light-shielding closure 80, which does not need to extend further toward the extension part 62. In order to improve the fixing reliability of the light-shielding closure 80 in the second state, the first adhesive 50 may further be partially extended towards the extension part 62. The fixing effect between the first adhesive 50 and the first release film 31 on the periphery of the first light-transmitting region 90 and the cooperation between the extension part 62 and the first slit F1 are beneficial to further improving the fixing reliability of the light-shielding closure 80.

Reference is made to FIGS. 20 and 21, in one embodiment of the present disclosure, the width S of the first slit F1 is greater than or equal to the thickness of the extension part 62, and the width S is less than or equal to 0.3 mm.

In one embodiment of the present disclosure, the width of the first slit F1 is set to be greater than the thickness of the extension part 62, which can facilitate the insertion of the extension part 62 into the first slit F1. In one embodiment, the width of the first slit F1 is less than or equal to 0.3 mm. For example, the width of the first slit F1 may be selected as 0.2 mm or 0.1 mm, which is beneficial to eliminating the problem that the electromagnetic shielding effect of the fixing adhesive film 30 is deteriorated due to the excessive width of the first slit F1.

Reference is made to FIG. 20 and FIG. 21. In one embodiment of the present disclosure, electronic component (s) is/are located on the first surface M1 of the first circuit board 20. The first slit F1 does not overlap with the projection of the electronic components in the first direction D1. When the first slit F1 is formed on the fixing adhesive film 30, the first slit F1 is arranged to avoid the electronic component(s) on the fixing adhesive film 30 in the embodiment, and the electronic component(s) on the first circuit board 20 may be covered by the fixing adhesive film 30, preventing the electronic components on the first circuit board 20 from being affected by electromagnetic radiation, to improve the stability of the first circuit board 20.

Figure 22:
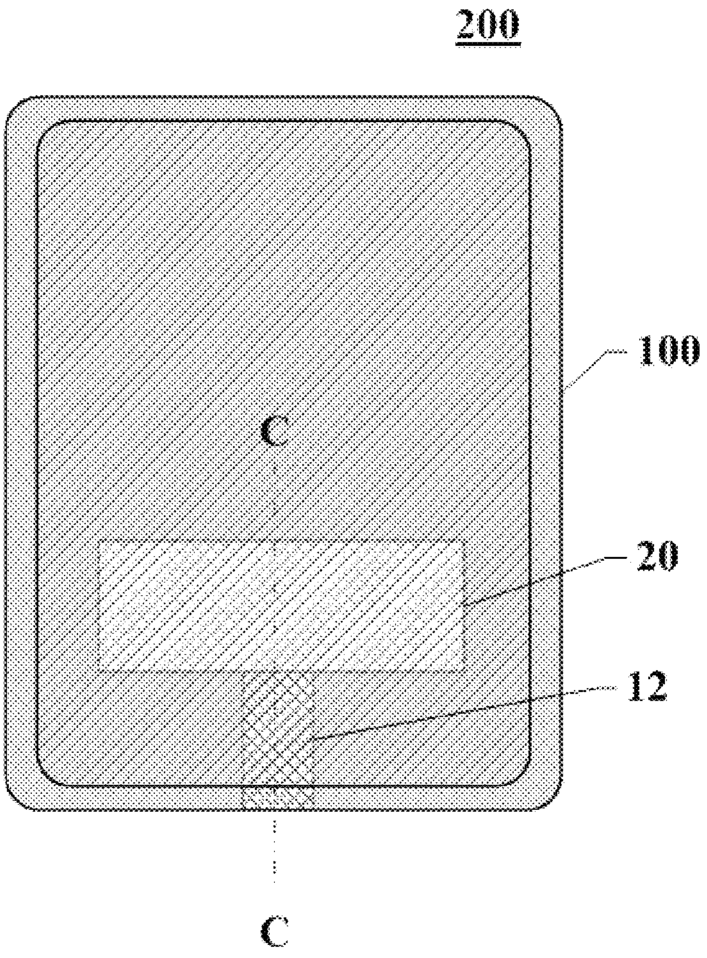
FIG. 22 is a schematic structural diagram of a display device according to an embodiment of the present disclosure.
Figure 23:
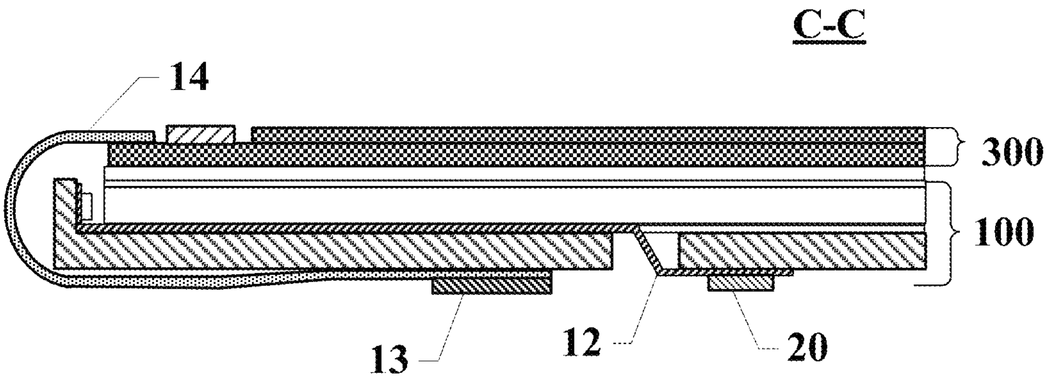
FIG. 23 is a section view in a C-C direction of the display device shown in FIG. 22.

FIG. 22 is a schematic structural diagram of a display device according to an embodiment of the present disclosure. FIG. 23 is a cross-sectional view of the display device shown in FIG. 22 through CC direction. Reference is made to FIGS. 22 and 23, based on the embodiments, a display device is provided according to an embodiment of the present disclosure. The display device 200 includes the light-emitting module 100 according to any one of the above embodiments. The display device further includes a display panel 300. The display panel is located on the light-emitting surface of the light-emitting module 100. In the light-emitting module 100, the second circuit board 12 is a flexible circuit board. After the second circuit board 12 is electrically connected to the first circuit board 20, the first circuit board 20 is driven to be folded to the back of the backlight module, to realize a display device with a narrow and lower frame. In one embodiment, the display panel 300 is bound to a flexible circuit board 14 and is electrically connected to a third circuit board 13 through the flexible circuit board 14. The third circuit board 13 is a PCB board, and the flexible circuit board 14 drives the third circuit board 13 to be folded to the back of the backlight module, to achieve the display device with the narrow and lower frame. FIG. 23 is a solution in which the light-emitting module and the display panel are connected to different PCB boards. In some embodiments of the present disclosure, the light-emitting module and the display panel may be connected to the same PCB board, which is not specifically limited in the present disclosure.

The display device 200 according to embodiments of the present disclosure may be a touch screen, a mobile phone, a tablet computer, a notebook computer, an electronic book or a television, or any other electronic device with a display function. The display device 200 according to embodiments of the present disclosure has beneficial effects of the display panel 100 according to the embodiment of the present disclosure. Reference may be made to the specific description of the display panel 100 in the above embodiments, which may not be repeated herein.

FIG. 22 only illustrates one shape of the display device 200 by showing a rounded rectangular structure as an example. In some other embodiments, the display device 200 may be rectangle, circle, ellipse or any other feasible shape, which is not specifically limited by the present disclosure.

Based on the above embodiments, according to the present disclosure, the light-emitting module and display device at least achieve the following beneficial effects when comparing with conventional technology.

In the light-emitting module and display device of the present disclosure, the light-emitting module includes a backlight module and a first circuit board electrically connected to the backlight module, where the second electrical connection terminal on the second circuit board in the backlight module is electrically connected to the first electrical connection terminal on the first circuit board to form an electrical connection region. The light-emitting module further includes a fixing adhesive film covering the first circuit board. The fixing adhesive film has an electromagnetic shielding function to prevent the first circuit board from being interfered by the external signal. The first circuit board is configured to provide the electrical signal to the backlight module, and the reliability of the electrical connection of the electrical connection region directly determines the light-emitting effect of the backlight module. According to the present disclosure, the fixing adhesive film includes a first light-transmitting region corresponding to the electrical connection region. In the first state, the electrical connection region is visible through the first light-transmitting region. In this way, the quality inspection of the state of the above-mentioned electrical connection region can be implemented through visual inspection. Compared with the method in the related technology that cannot conduct quality inspection of the electrical connection region, it is beneficial to improving the efficiency of quality inspection for products and effectively reducing the probability of missed inspections.

Although some specific embodiments of the present disclosure have been described in detail through examples, the above embodiments are only for illustration and are not intended to limit the scope of the present disclosure. The above embodiments can be modified without departing from the embodiments of the present disclosure. The scope of the present disclosure is defined by the appended claims.

The invention claimed is:

1. A light-emitting module, comprising:

a backlight module and a first circuit board electrically connected to the backlight module, wherein the first circuit board comprises a first surface and at least one first electrical connection terminal on the first surface;

the backlight module comprises a second circuit board, wherein the second circuit board comprises at least one second electrical connection terminal, and the at least one first electrical connection terminal and the at least one second electrical connection terminal are electrically connected on the first surface to form an electrical connection region;

the light-emitting module further comprises a fixing adhesive film, wherein the fixing adhesive film at least covers the first surface, an overlapping region of the second circuit board and the first surface, and the electrical connection region;

the fixing adhesive film comprises a first light-transmitting region, wherein the first light-transmitting region and the electrical connection region are overlapped in a first direction, the first direction is perpendicular to a plane where the first circuit board is located; and the light-emitting module at least comprises a first state, wherein the electrical connection region is visible through the first light-transmitting region in the first state.

2. The light-emitting module according to claim 1, wherein an outer outline of an orthographic projection of the first light-transmitting region on the plane where the first circuit board is located, in the first direction, is located at a periphery of an outer outline of an orthographic projection of the electrical connection region on the plane where the first circuit board is located, in a case that the light-emitting module only comprises the first state.

3. The light-emitting module according to claim 2, wherein a first space is provided between the outer outline of the first light-transmitting region and the outer outline of the electrical connection region, and a width D of the first space ranges from 0.5 mm to 1 mm.

4. The light-emitting module according to claim 1, wherein the fixing adhesive film comprises a first release film, a second release film and a light-shielding adhesive layer, wherein the first release film and the second release film are arranged oppositely in the first direction, and light-shielding adhesive layer is located between the first release film and the second release film; and the light-shielding adhesive layer comprises a first opening in a case that the light-emitting module only comprises the first state, wherein the first opening runs through the light-shielding adhesive layer in a thickness direction of the light-shielding adhesive layer, a projection of the first light-transmitting region and a projection of the first opening are overlapped in the first direction.

5. The light-emitting module according to claim 4, wherein the fixing adhesive film further comprises an insulating adhesive layer located between the light-shielding adhesive layer and the second release film, and a transparency of at least one of the first release film, the second release film and the insulating adhesive layer in the first light-transmitting region is less than or equal to 50%.

6. The light-emitting module according to claim 1, wherein the light-emitting module further comprises a light-shielding closure; and the light-emitting module further comprises a second state, the light-shielding closure covers the first light-transmitting region in the second state.

7. The light-emitting module according to claim 6, wherein at least part of layers of the fixing adhesive film are used as the light-shielding closure.

8. The light-emitting module according to claim 7, wherein the fixing adhesive film comprises a first release film, a second release film and a light-shielding adhesive layer, wherein the first release film and the second release film are arranged oppositely in the first direction, and light-shielding adhesive layer is located between the first release film and the second release film, the first release film is located on a side of the second release film away from the first surface;

the light-shielding closure comprises a folding portion and a connecting portion connected to the folding portion, wherein the folding portion is folded using the connecting portion as a pivot, the folding portion at least comprises the first release film and the light-shielding adhesive layer, the connecting portion at least comprises the first release film; and the folding portion, in the first state, is folded towards a side away from the electrical connection region by using the connecting portion as the pivot to form the first light-transmitting region; the projection of the light-shielding adhesive layer in the folding portion, in the second state, covers the first light-transmitting region in the first direction.

9. The light-emitting module according to claim 8, wherein the light-shielding closure further comprises a first isolation portion at least located on a surface of the light-shielding closure away from the first release film.

10. The light-emitting module according to claim 8, wherein the light-shielding closure further comprises a second isolation portion at least located on a side surface of the light-shielding adhesive layer in the light-shielding closure.

11. The light-emitting module according to claim 8, wherein the fixing adhesive film further comprises an insulating adhesive layer and a first adhesive layer, the insulating adhesive layer and the first adhesive layer are located between the light-shielding adhesive layer and the second release film, and the insulating adhesive layer is located between the first adhesive layer and the second release film; the first adhesive layer comprises a second opening, and the second opening runs through the first adhesive layer in the first direction, a projection of the second opening and a projection of the first light-transmitting region are overlapped.

12. The light-emitting module according to claim 11, wherein the light-shielding closure comprises a third isolation portion at least located on a surface of the light-shielding adhesive layer in the light-shielding closure away from the first release film.

13. The light-emitting module according to claim 8, further comprising:

a tearing portion located on a side of the first release film in the folding portion away from the light-shielding adhesive layer, and the tearing portion is fixed to the folding portion.

14. The light-emitting module according to claim 13, wherein the tearing portion comprises a first part and an extension part connected to the first part, the first part is fixed to the folding portion, the extension part is at least located on a side of the first part away from the connecting portion in the second state.

15. The light-emitting module according to claim 14, wherein the first part is fixed to the folding portion through a first adhesive; a projection of at least a part of the extension part and a projection of the first adhesive are not overlapped in the first direction in the second state.

16. The light-emitting module according to claim 15, wherein the first adhesive and a part of the first release film surrounding the first light-transmitting region are overlapped in the first direction in the second state.

17. The light-emitting module according to claim 14, wherein the fixing adhesive film surrounding the first light-transmitting region comprises a first slit, and the first slit at least runs through the fixing adhesive film in the first direction; the extension part is inserted into the first slit in the second state.

18. The light-emitting module according to claim 17, wherein a width S of the first slit is greater than or equal to a thickness of the extension part, and the width S is less than or equal to 0.3 mm.

19. The light-emitting module according to claim 18, wherein the first circuit board comprises an electronic component located on the first surface thereof, a projection of the first slit and a projection of the electronic component are not overlapped in the first direction.

20. A display device, comprising:

a light-emitting module, wherein the light-emitting module comprises a backlight module and a first circuit board electrically connected to the backlight module, wherein the first circuit board comprises a first surface and at least one first electrical connection terminal on the first surface;

the backlight module comprises a second circuit board, wherein the second circuit board comprises at least one second electrical connection terminal, and the at least one first electrical connection terminal and the at least one second electrical connection terminal are electrically connected on the first surface to form an electrical connection region;

the light-emitting module further comprises a fixing adhesive film, wherein the fixing adhesive film at least covers the first surface, an overlapping region of the second circuit board and the first surface, and the electrical connection region;

the fixing adhesive film comprises a first light-transmitting region, wherein the first light-transmitting region and the electrical connection region are overlapped in a first direction, the first direction is perpendicular to a plane where the first circuit board is located; and the light-emitting module at least comprises a first state, wherein the electrical connection region is visible through the first light-transmitting region in the first state.

* * * * *